(12) United States Patent
Schommer et al.

(10) Patent No.: US 8,127,599 B2
(45) Date of Patent: Mar. 6, 2012

(54) METHOD FOR MEASURING THE CHASSIS OF A MOTOR VEHICLE, DEVICE FOR MEASURING A CHASSIS AND MOTOR VEHICLE TEST LINE

(75) Inventors: Stefan Schommer, Unterschleissheim (DE); Craig Dry, Mittelstetten (DE); Hermann Bux, Adelzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 12/303,087

(22) PCT Filed: Aug. 24, 2007

(86) PCT No.: PCT/EP2007/058800
§ 371 (c)(1),
(2), (4) Date: Aug. 10, 2009

(87) PCT Pub. No.: WO2008/028826
PCT Pub. Date: Mar. 13, 2008

(65) Prior Publication Data
US 2009/0301181 A1    Dec. 10, 2009

(30) Foreign Application Priority Data
Sep. 6, 2006  (DE) .......................... 10 2006 041 822

(51) Int. Cl.
*G01M 17/00*    (2006.01)
(52) U.S. Cl. ................................. 73/117.01
(58) Field of Classification Search ............... 73/116.01, 73/116.08, 116.09, 117.01–117.03
See application file for complete search history.

(56) References Cited

U.S. PATENT DOCUMENTS

| | | | |
|---|---|---|---|
| 5,600,435 A | 2/1997 | Bartko et al. | |
| 6,397,164 B1 | 5/2002 | Nobis et al. | |
| 6,404,486 B1* | 6/2002 | Nobis et al. | 356/139.09 |
| 6,690,456 B2* | 2/2004 | Bux et al. | 356/139.09 |
| 6,748,796 B1* | 6/2004 | Van Den Bossche | 73/116.01 |
| 7,313,869 B1* | 1/2008 | Rogers | 33/203.18 |
| 7,458,165 B2* | 12/2008 | Rogers | 33/203.18 |
| 7,535,558 B2* | 5/2009 | Uffenkamp et al. | 356/138 |
| 7,703,213 B2* | 4/2010 | Rogers | 33/203.18 |
| 7,860,295 B2* | 12/2010 | Donner et al. | 382/141 |
| 7,877,883 B2* | 2/2011 | Schommer et al. | 33/203 |
| 2002/0080343 A1 | 6/2002 | Bux et al. | |
| 2008/0267441 A1 | 10/2008 | Bux et al. | |
| 2009/0216484 A1* | 8/2009 | Schommer et al. | 702/150 |

FOREIGN PATENT DOCUMENTS

| | | |
|---|---|---|
| DE | 197 57 760 | 7/1999 |
| DE | 10 2005 022 565 | 11/2006 |

(Continued)

OTHER PUBLICATIONS

International Search Report, PCT/EP2007/058800, dated Nov. 7, 2007.

*Primary Examiner* — Freddie Kirkland, III
(74) *Attorney, Agent, or Firm* — Kenyon & Kenyon LLP

(57) ABSTRACT

A method for the chassis measurement of a motor vehicle by a chassis measuring device, measuring in a contactless manner, having two measuring devices situated opposite to each other, includes the steps of positioning a first vehicle axle between the two measuring devices; the contactless measuring of the two wheel rims of the first vehicle axle by the two measuring devices; the positioning of a second vehicle axle between the two measuring devices; the contactless measuring of the two wheel rims of the second vehicle axle by the two measuring devices; and ascertaining the wheel position values of all the measured wheel rims by the chassis measuring device.

15 Claims, 3 Drawing Sheets

FOREIGN PATENT DOCUMENTS

| | | |
|---|---|---|
| EP | 0 120 329 | 10/1984 |
| EP | 1 184 640 | 3/2002 |
| JP | 5-87700 | 4/1983 |
| JP | 61-178607 | 8/1986 |
| WO | WO 02/31437 | 4/2002 |
| WO | WO 2005/090906 | 9/2005 |

* cited by examiner

METHOD FOR MEASURING THE CHASSIS OF A MOTOR VEHICLE, DEVICE FOR MEASURING A CHASSIS AND MOTOR VEHICLE TEST LINE

FIELD OF THE INVENTION

The present invention relates to a method for measuring a chassis of a motor vehicle by using a chassis measuring device that measures in a contactless manner, having two measuring devices situated opposite to each other, a chassis measuring device for motor vehicles, as well as a motor vehicle test line having such a chassis measuring device.

BACKGROUND INFORMATION

Before the chassis of a motor vehicle can be measured, sensors or auxiliary devices, such as targets frequently have to be mounted on the respective wheel rims or the wheels. However, these costly preparatory activities contradict the requirement for short measuring times in the reception department of a repair shop, and these preparatory activities make the chassis measurement expensive.

SUMMARY

Example embodiments of the present invention provide a method and a device for chassis measurement, using which the chassis of a motor vehicle is able to be measured more rapidly and more cost-effectively.

The method according to example embodiments of the present invention, for measuring the chassis of a motor vehicle, works with a chassis measuring device measuring in a contactless manner, that is measuring optically, using two measuring devices situated opposite to each other. In this context, a first vehicle axle having two wheel rims is first positioned between the two measuring devices and the two wheel rims of this first vehicle axle are measured in a contactless manner by the two measuring devices. Next, a second vehicle axle is positioned between the two measuring devices, and the wheel rims of the second vehicle axle are measured by the two measuring devices. From the two measuring values ascertained from the two measurements, the wheel position values of all four measured wheel rims are ascertained by the chassis measuring device. The wheel position values of all the axles are offset with respect to one another in the process. In the case of a two-axle motor vehicle, especially in a passenger car, the rear axle values may optionally be taken into account in the front axle.

The rear axle values are important for the chassis measuring. For the offsetting of the rear axle values and the front axle values in the method according to example embodiments of the present invention (diagnostic version), the method is begun using straight-ahead travel and the first axle is driven in, or rather is positioned between the two measuring devices. During all this there is no turning in, and thus the measuring values of the rear axle, especially the wheel toe values of the rear axle, may be put in relation to the measured values of the front axle, in order to calculate the real travel state, the position of the front wheels with respect to the geometric driving axle and the resulting driving axle angle.

According to example embodiments of the present invention, the method makes possible the complete measurement of the chassis of a motor vehicle using one optical chassis measuring device that operates in a contactless manner, which has only two measuring devices situated opposite to each other, and for which no additional auxiliary devices are required, particularly no sensors or targets that have to be mounted on the wheel.

Because only two measuring devices are required, and the chassis of the motor vehicle is measured axle by axle, one after another, a high-quality chassis measuring device or axle-measuring equipment is made available, which works very rapidly and is very cost-effective at the same time. This is of special importance, particularly since, in the reception area of a repair shop, the factor of speed of measurement is particularly a deciding factor.

The measuring devices advantageously each have two measuring heads having measuring cameras and having measuring sensors, and the two measuring heads are aligned at different angles respectively with one wheel rim that is to be measured. The measuring devices may be constructed, for instance, as described in FIG. 3 of DE 2005 022 565.

According to an example embodiment of the present invention, the measurement sequences in the chassis measuring device have been and are stored particularly in a data processing unit, such as a repair shop computer. The measuring sequences are then controlled by the chassis measuring device, especially by its data processing unit. By storing prespecified measuring sequences, data and sequences that are standardized and specific to a vehicle may be used, which is able to improve the quality of the measuring results obtained.

The values measured in the measuring sequences for the wheel rims are advantageously stored in the chassis measuring device, especially in its data processing unit, so that they may be retrieved at any time when they are needed.

The wheel position values of all measured wheel rims, ascertained from the measured values, may be stored in the chassis measuring device and/or made visual on a screen and/or, in response to a customer instruction, be printed and/or transmitted to an interface, usually a network interface, so that it may be processed further or compared to other data.

According to an example embodiment of the present invention, a positioning aid and a drive-on aid is provided, so that the vehicle axles or rather the respective wheel rims of a vehicle axle may be positioned most simply with respect to the two measuring devices, and so that, accordingly, the chassis measuring device may be used simply and safely.

The measuring devices themselves may be used, for example, as such positioning aids by the driver.

In an example embodiment, the positioning aid may be designed as a mirror or a mirror system, so that the driver of the motor vehicle is able to detect and change the respective position of the measuring devices with respect to the wheel rims via these mirrors.

The position of the wheel rims with respect to the measuring devices may be displayed via a return message signal, for instance, via a screen or a monitor, and a return message concerning a position change to be undertaken, and its direction, may be output. Such a positioning method may be integrated into the control of the chassis measuring device according to example embodiments of the present invention.

In an example embodiment of the present invention, the two measuring devices are installed opposite to each other in a stationary mount, whereby they are located in a fixed spatial relation to each other, and a separate reference system may therefore be omitted.

Alternatively, the two measuring devices may also be displaceable and be set up opposite to each other. In order to determine the position of the two measuring devices with respect to each other, the two measuring devices have a reference system. This reference system may be formed by separate reference system heads or reference system sensors, which are situated on or in the measuring devices. Such a reference system is described in EP 1 184 640 for a chassis measuring device having four measuring devices. By analogy, a reference system for the present chassis measuring device having two measuring devices may include a measuring target, which is situated on one of the two measuring devices, within the visual range of the other measuring device when a motor vehicle is standing between them. Accordingly, one single transverse connection is sufficient as reference system for the two displaceable measuring devices. In order to increase the accuracy even more, both a separate measuring target and a separate reference camera may be developed on each measuring device, the reference target of the one camera in each case being within the visual field of the reference camera when there is no motor vehicle standing between the two measuring devices. A reference to the direction of gravity may also be provided for camber measurement, in order to take into account the alignment of the measuring devices to it during the positioning and during the chassis measurement. This reference for camber measurement may, for instance, be designed in the form of a pendulum or in another way known to one skilled in the art, and it may also be integrated into the reference system.

According to an example embodiment of the present invention, the steps of positioning an additional vehicle axle between the two measuring devices and of measuring in a contactless manner the two wheel rims of the additional vehicle axle by the two measuring devices may be repeated for a third and every additional vehicle axle, if necessary. For this reason, the method according to example embodiments of the present invention is also applicable to motor vehicles having three or more axles, especially for commercial vehicles and trucks. In order to ascertain the wheel position values of all measured wheel rims, the measured values of the wheel rims of all n axles may be cleared with one another.

Furthermore, after termination of a measuring step for the wheel rims of an axle, a notice to the user may be generated, for instance, via an optical signal (screen, display unit) or via an acoustical signal (buzz, voice output), that one should continue to drive the motor vehicle forward, in order to position the wheel rims of the next axle between the two measuring devices.

Example embodiments of the present invention also relate to a chassis measuring device for motor vehicles that has two measuring devices. These are positioned, or able to be positioned, opposite to each other in a measuring station in such a way that both measuring devices are in each cases allocated to one wheel rim of the same axle of a motor vehicle, and that in each case one wheel rim is able to be measured by one measuring device. The relative positions of the measuring devices with respect to each other are determined during the performance of the measurements. The chassis measuring device also includes a data processing unit, in particular, a repair shop computer, that is in a position to recalculate the measuring results of successive measurements of wheel rims of at least two vehicle axles of the motor vehicle into wheel position values, while taking into account the relative position of the measuring devices with respect to one another. Moreover, the chassis measuring device has an output unit to output wheel position values.

This chassis measuring device makes available a high-quality axle measuring equipment which measures the chassis of the motor vehicle rapidly and reliably, and which is also cost-effective based on the fact that it requires only two measuring devices.

In an example embodiment of the chassis measuring device, the two measuring devices each have two measuring heads, having measuring cameras and measuring sensors, which are directed at a wheel rim that is to be measured at different angles. The measuring heads are able to be constructed, in this instance, as described in FIG. 3 of DE 10 2005 022 565, and in addition, a reference with respect to gravitational force may be provided for measuring camber, as described above. A measurement of the chassis can be carried out in a contactless manner, using such a measuring device, and obtaining very accurate measuring results.

If the two measuring devices are installed in a fixed manner opposite each other, their relative position with respect to each other is defined, and no reference system needs to be provided.

Alternatively, the measuring devices may be developed to be displaceable on the measuring station. In this case, a reference system should be provided that includes a transverse connection of the two measuring devices, as was described above. The relative positions of the measuring devices with respect to each other is able to be determined thereby, and the wheel position values of the measured wheel rims are able to be ascertained exactly.

Furthermore, measuring sequences for the control of measurements of the two measuring devices may be stored in the data processing unit, especially the repair shop computer, so that one may retrieve standardized sequences and data, whereby the measurements are simplified and their results are improved.

In order to simplify the positioning of the vehicle axles, or rather their wheel rims, with respect to the measuring devices, a positioning aid may be provided, as described above.

Using the chassis measuring device of the type described above, vehicles having two axles, such as passenger cars, and vehicles having more than two axles, such as commercial vehicles may be measured by positioning the wheel rims of each axle opposite the two measuring devices, one after another, and then measuring them, and by finally clearing the wheel position values of all axles with one another.

Example embodiments of the present invention also relate to a motor vehicle test line into which a chassis measuring device of the type described above is integrated. Because of that, the guide plate known in test lines is able to be replaced, which represents cost savings. The broadened measuring scope is advantageous, in this instance, at least track and camber, in contrast to the tracking plate, which delivers only one track-like value. Because of the saving of the tracking plate and because of the positioning, according to example embodiments of the present invention, of the measuring heads next to the chassis tester, the test line may be shortened and thus uses less space, which represents a further advantage. The measuring heads of the measuring devices are used at the same time as positioning aids for the chassis tester, so that the wheel rims of one axle of the motor vehicle are able to be aligned especially simply opposite the measuring devices. Finally, the chassis measuring device of the type described above may be integrated into an automatic operation or a superautomatic operation as an additional device.

A motor vehicle test line includes a chassis tester as well as a brake test stand, and normally also a tracking plate which, however, may be advantageously omitted in the motor vehicle test line according to example embodiments of the present invention. In testing organizations the motor vehicle test line is often expanded by having a ball joint clearance tester which, in turn, is integrated into a pit or a lifting platform. In some cases, the motor vehicle test line is still further expanded by having an exhaust gas tester and a headlight aiming device.

In summary, the chassis measuring device for motor vehicles of the type described above may also be designated as a wheel-alignment analyzer for diagnosis and reception.

Example embodiments of the present invention are described in the following with reference to the enclosed drawings.

DETAILED DESCRIPTION

Figure 1:
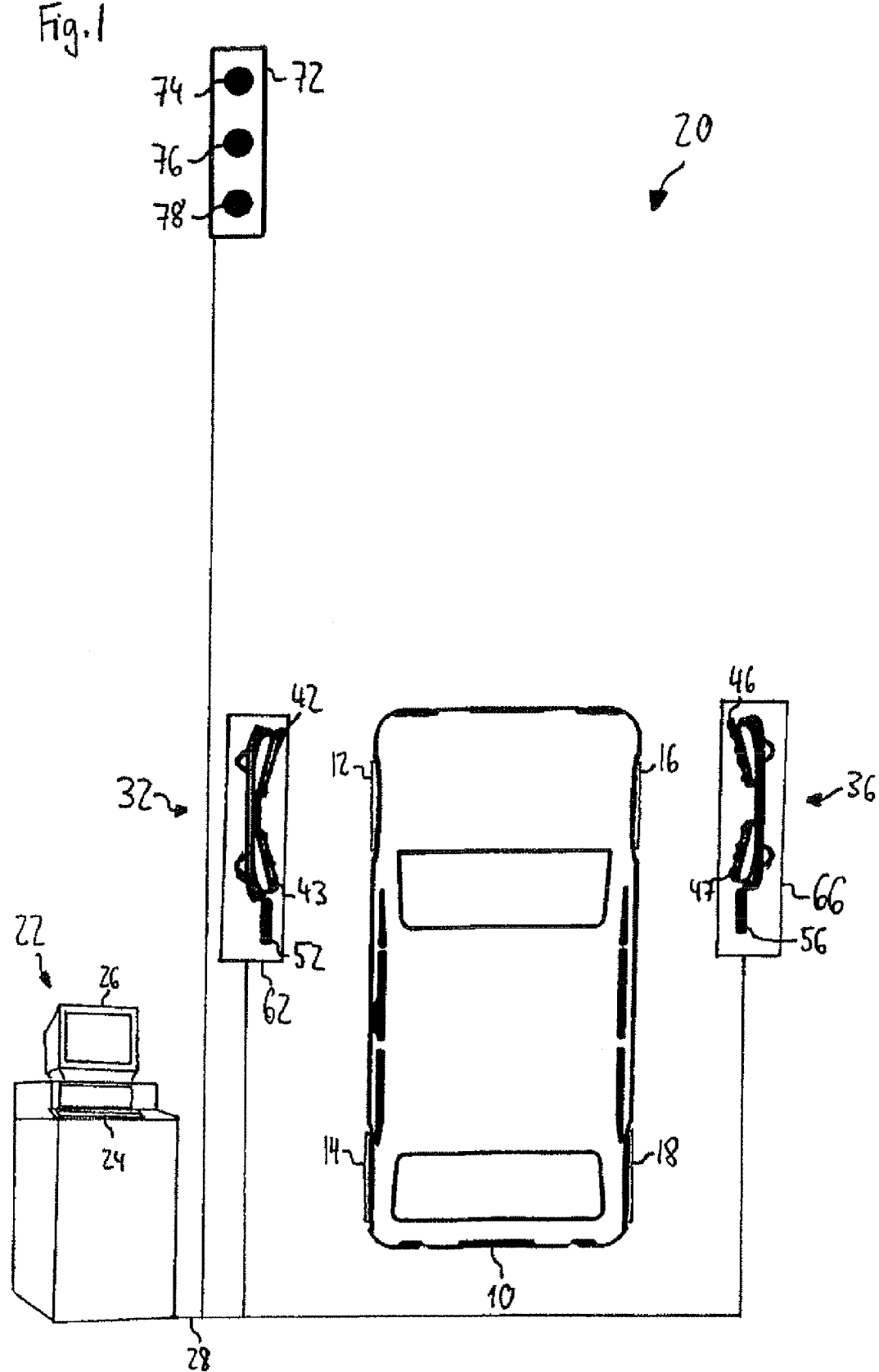
FIG. 1 shows a schematic top view onto a measuring station having a motor vehicle standing on the measuring station.

FIG. 1 shows a schematic top view of a measuring station 20, having a motor vehicle 10 standing on the measuring station 20.

Motor vehicle 10 is situated on measuring station 20 for the measurement of its chassis. Motor vehicle 10 has a front left wheel rim 12, a rear left wheel rim 14, a front right wheel rim 16 and a rear right wheel rim 18.

Two measuring devices 32 and 36 are situated opposite to each other on measuring station 20. The two measuring devices 32 and 36 have two displaceable base plates 62 and 66, along the longitudinal axis of motor vehicle 10. On these base plates 62 and 66, two measuring cameras 42, 43 and 46, 47 are situated, which are directed at the respective opposite wheel rim 12 and 16, at different angles.

On displaceable base plates 62 and 66 of measuring devices 32 and 36, reference system measuring heads 52 and 56 are furthermore situated, which form a transverse connection between the two measuring devices 32 and 36, in order thus to determine the relative positions of measuring devices 32 and 36 with respect to each other.

In an exemplary embodiment of this reference system, one of the two reference system measuring heads 52 or 56 is developed as a measuring target and the other as a measuring camera. In an exemplary embodiment that works even more accurately, both reference system measuring heads 52 and 56 have respectively one measuring camera and one measuring target that is able to be detected by the respectively opposite measuring camera, in order to determine the relative positions of measuring devices 32 and 36 with respect to each other. In addition, a reference to the force of gravity may be provided for the camber measurement, as described above. When using such a reference system, a roughly aligned mounting position of measuring devices 32 and 36 is sufficient for an exact determination of the relative positions and the distances of measuring devices 32 and 36 from each another. These are able to be measured and also realigned continuously.

In an exemplary embodiment, measuring devices 32 and 36 may also be situated in a fixed manner within measuring station 20, but in this case movable base plates 62 and 66 as well as reference system measuring heads 52 and 56 may be omitted, for, the relative position of measuring devices 32 and 36 with respect to each other is known and defined because of their fixed mounting.

In FIG. 1 a display unit 72 is also shown, which includes an illuminated display "forward" 74, an illuminated display "stop" 76 and an illuminated display "backwards" 78. Lamp displays "forward" 74 and "backwards" 78 indicate to the operator in which direction motor vehicle 10 is to be moved, so that wheel rims 12, 16 or 14, 18 of the respective vehicle axle are aligned optimally with respect to measuring devices 32 and 36. Illuminated display "stop" 76 indicates that wheel rims 12, 16 and 14, 18 of the respective vehicle axle are positioned optimally with respect to measuring devices 32 and 36.

Figure 2:
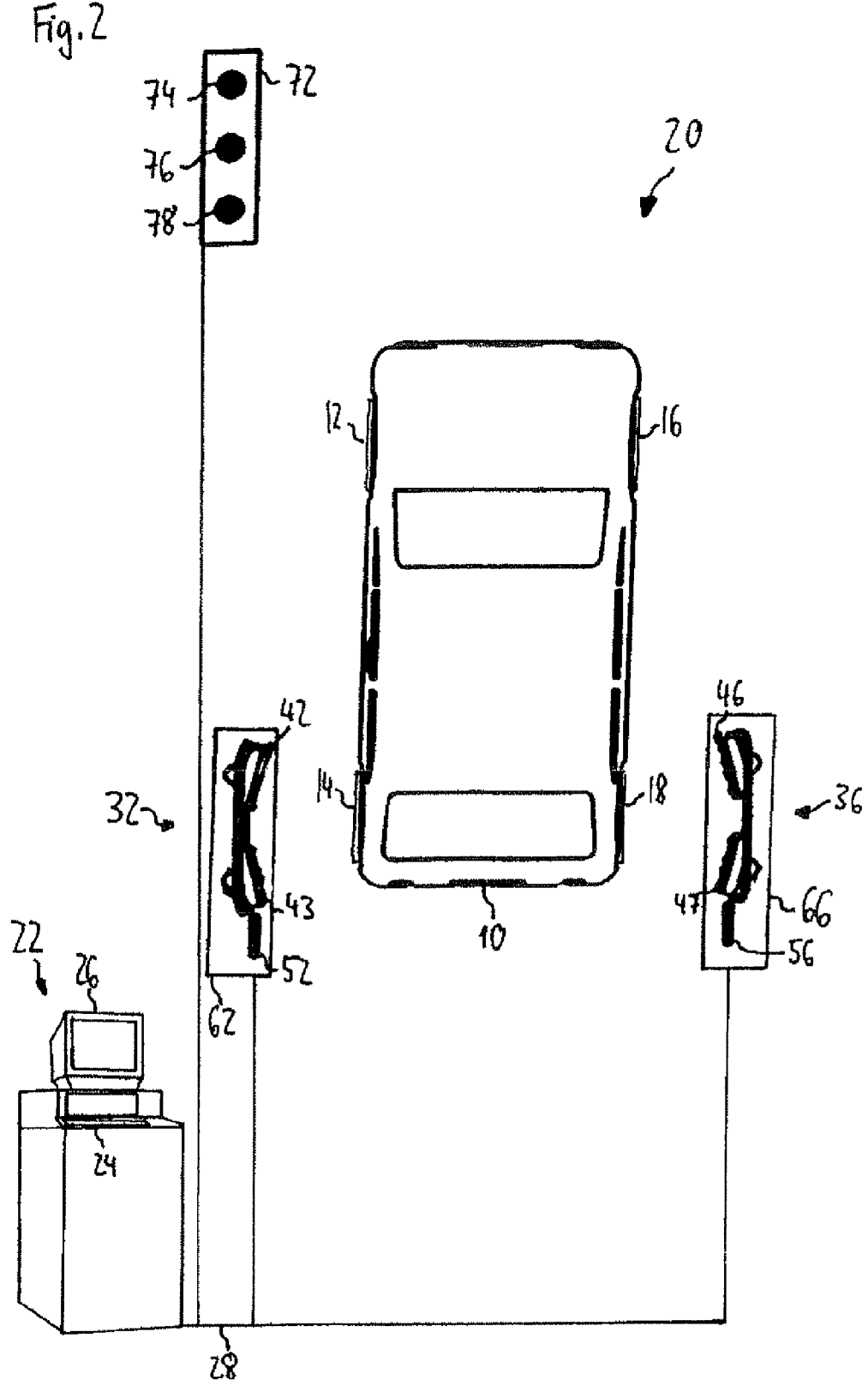
FIG. 2 shows a schematic top view onto the measuring station of FIG. 1, having a motor vehicle situated farther forward in the measuring station.

Display unit 72 is shown in FIGS. 1 and 2 only in exemplary fashion as signal lights, but other visualizations, such as an arrow control on a screen, or acoustical or mechanical return message signals are also possible. Display unit 72 is preferably situated outside motor vehicle 10, within the visual range of the driver. Alternatively to this, display unit 72 may also be a mobile unit, which the driver can take along with him in motor vehicle 10.

Furthermore, in FIG. 1 a repair shop computer 22 may be seen, having a keyboard 24 and a monitor 26, which is connected via connecting lines 28 to measuring devices 32 and 36 and to display unit 72. Connecting lines 28 may be developed cable-bound, in this instance, or as radio connections.

The chassis measuring device includes the two measuring devices 32 and 36, repair shop computer 22 and display unit 72.

In FIG. 1, motor vehicle 10 stands on measuring station 20 in such a way that wheel rims 12 and 16 of its front axle are positioned optimally with respect to measuring devices 32 and 36.

FIG. 2 shows a schematic top view onto measuring station 20, having a motor vehicle 10 situated farther forward in the measuring station 20.

The same elements are characterized in FIG. 2 by the same reference numerals as in FIG. 1. To avoid repetition, they are not explained again.

In FIG. 2, motor vehicle 10 stands on measuring station 20 in such a way that wheel rims 14 and 18 of its rear axle are positioned optimally with respect to measuring devices 32 and 36.

Figure 3:
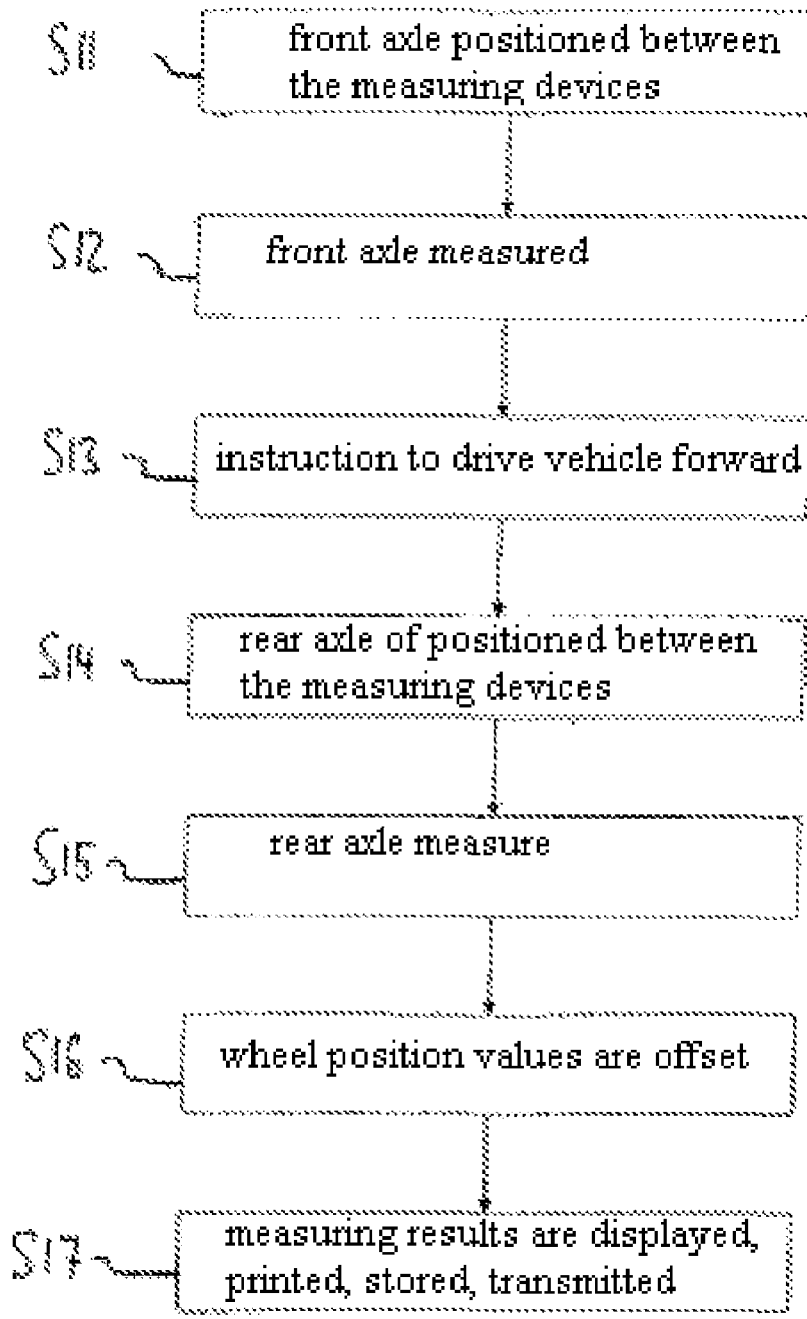
FIG. 3 shows a flow chart of the method according to an example embodiment of the present invention, for chassis measurement of the motor vehicle in FIGS. 1 and 2.

FIG. 3 shows a flow chart of a method according to the present invention for the chassis measurement of motor vehicle 10 by the chassis measuring device shown in FIGS. 1 and 2, that measures in a contactless manner. This method may also be designated as a diagnostic measurement having a system that measures optically, in a contactless manner.

In method step S11, the front axle of motor vehicle 10 is positioned between measuring devices 32 and 36 in such a way that wheel rims 12 and 16 are aligned optimally opposite measuring cameras 42, 43 and 46, 47. This may be done using a positioning aid, such as using a display unit 72. This position of motor vehicle 10 is shown in FIG. 1.

In method step 12, wheel rims 12 and 16 are now measured, according to a sequence stored in the chassis measuring device, particularly in repair shop computer 22, and the measured values are stored. In method step S13 an instruction to the user now takes place, that he should drive motor vehicle 10 farther forward within measuring station 20. This instruction may take place, for instance, by the lighting up of display "forward" 74 of display unit 72. Similarly, such an instruction may be displayed on a screen, or a corresponding buzz signal or voice signal may be given out.

In method step S14, the rear axle of motor vehicle 10 is positioned between measuring devices 32 and 36 in such a way that wheel rims 14 and 18 are aligned optimally with respect to measuring cameras 42, 43 and 46, 47. This may be done using a positioning aid, such as using a display unit 72. This position of motor vehicle 10 is shown in FIG. 2.

In method step S15, the rear axle, especially its wheel rims 14 and 18, are now measured, namely, according to a sequence stored in the chassis measuring device, especially in its repair shop computer 22, and the measured values are stored.

In method step S16, the wheel position values of all the axles are offset with respect to one another. For the offsetting of the rear axle values and the front axle values in the method according to the present invention (diagnostic version), the method is begun during straight-ahead travel and the first axle is driven in, or rather is positioned between the two measuring devices. During all this there is no turning in, and thus the measured values of the rear axle, especially the wheel toe of the rear axle, may be put in relation to the measured values of the front axle, in order to calculate the real travel state, the position of the front wheels with respect to the geometric driving axle and the resulting driving axle angle. In the method according to example embodiments of the present invention (diagnostic version) the levels measured front and rear possibly have an effect on the setpoint values and the setpoint/actual comparison of the respective other axle, which may also be taken into account.

In method step S17, the measuring results are visualized on screen 26 and/or are printed out on a printer according to a customer's instruction, and/or are stored and/or are transmitted to an interface, preferably a network interface.

In a two-axle motor vehicle 10, as shown in FIGS. 1 and 2, the rear axle values may optionally be included in the front axle.

For a motor vehicle having more than two axles, such as in the case of a commercial vehicle, the method may be correspondingly broadened in that method steps S13, S14 and S15 are repeated for the third axle and, if necessary, for each additional axle. Because of the chassis measuring device according to the present invention, vehicles having more than two axles are thereby also able to be measured in a simple manner. In the case of commercial vehicles, especially trucks, n axles may optionally be offset with respect to one another.

LIST OF REFERENCE CHARACTERS 10 motor vehicle
12, 14, 16, 18 wheel rims
20 measuring station
22 repair shop computer
24 keyboard
26 screen
28 connecting lines
32, 36 measuring devices
42, 43; 46, 47 measuring cameras
52, 56 reference system measuring heads
62, 66 base plates
72 display unit
74 display "forward"
76 display "stop"
78 display "backwards"

What is claimed is:

1. A method for chassis measurement of a motor vehicle by a chassis measuring device that measures in a contactless manner, having two measuring devices arranged opposite to each other on a measuring station, comprising:
 a) positioning a first vehicle axle between the two measuring devices so that the motor vehicle stands on the measuring station in such a way that wheel rims of its first axle are positioned optimally with respect to the measuring devices;
 b) contactless measuring of two wheel rims of the first vehicle axle by the two measuring devices;
 c) positioning a second vehicle axle between the two measuring devices so that the motor vehicle stands on the measuring station in such a way that wheel rims of its second axle are positioned optimally with respect to the measuring devices;
 d) contactless measuring of two wheel rims of the second vehicle axle by the two measuring devices; and
 e) ascertaining wheel position values of all measured wheel rims by the chassis measuring device,
 wherein no targets are applied to the wheel.

2. The method according to claim 1, wherein measuring sequences are stored in at least one of (a) the chassis measuring device and (b) a data processing unit of the chassis measuring device, and the measuring sequences being controlled in the steps b) and d) by at least one of (a) the chassis measuring device and (b) the data processing unit.

3. The method according to claim 1, wherein the values measured in steps b) and d) are stored in at least one of (a) the chassis measuring device and (b) a data processing unit of the chassis measuring device.

4. The method according to claim 1, wherein the wheel position values of all measured wheel rims are at least one of (a) stored and (b) output on a screen.

5. The method according to claim 1, wherein the vehicle axles are positioned with respect to the two measuring devices in the steps and using a positioning aid.

6. The method according to claim 1, wherein the two measuring devices are installed in a fixed manner opposite to each other.

7. The method according to claim 1, wherein the two measuring devices are positionable and are arranged opposite to each other, and an exact position of the two measuring devices with respect to each other is determined via a reference system.

8. The method according to claim 1, wherein in the case in which the motor vehicle that is to be measured has three or more vehicle axles, the steps c) and d) are to be repeated for the third and each additional vehicle axle.

9. A chassis measuring device for motor vehicles, comprising:
 two measuring devices positionable opposite to each other on a measuring station such that the two measuring devices are respectively allocated to one wheel rim of a same axle of a motor vehicle and that by one measuring device respectively one wheel rim is measureable, relative positions of the measuring devices with respect to each other being determined during performance of measurements, wherein the motor vehicle stands on the measuring station in such a way that wheel rims of its first axle are positioned optimally with respect to the measuring devices for a first measurement of its first axle, and the motor vehicle stands on the measuring station in such a way that wheel rims of its second axle are positioned optimally with respect to the measuring devices for a second measurement of its second axle;
 a data processing unit adapted to recalculate measuring results of successive measurements of wheel rims of at least two vehicle axes of the motor vehicle, while taking into account the relative positions of the measuring devices with respect to each other, into wheel position values; and an output unit adapted to output the wheel position values,
wherein no targets are applied to the wheel.

10. The chassis measuring device according to claim 9, wherein the two measuring devices in each case have two measuring heads, having measuring cameras, that are aligned at different angles with a wheel rim that is to be measured.

11. The chassis measuring device according to claim 9, wherein the two measuring devices are installed in a fixed manner opposite to each other.

12. The chassis measuring device according to claim 9, wherein the two measuring devices are displaceable and have a reference system, in order to determine the relative positions with respect to each other.

13. The chassis measuring device according to claim 9, wherein measuring sequences for controlling measurements of the two measuring devices are stored in the data processing unit.

14. The chassis measuring device according to claim 9, further comprising a positioning aid adapted to position the vehicle axles with respect to the two measuring devices.

15. A motor vehicle test line, comprising:
a chassis measuring device for motor vehicles, including:
two measuring devices positionable opposite to each other on a measuring station such that the two measuring devices are respectively allocated to one wheel rim of a same axle of a motor vehicle and that by one measuring device respectively one wheel rim is measureable, relative positions of the measuring devices with respect to each other being determined during performance of measurements;
a data processing unit adapted to recalculate measuring results of successive measurements of wheel rims of at least two vehicle axes of the motor vehicle, while taking into account the relative positions of the measuring devices with respect to each other, into wheel position values; and
an output unit adapted to output the wheel position values,
wherein no targets are applied to the wheel.

* * * * *